United States Patent [19]

Findley et al.

[11] 4,007,442
[45] Feb. 8, 1977

[54] INTERMIXED LINE HEIGHTS AND BLANK LINE FORMATION IN A BUFFERED PRINTER

[75] Inventors: Gerald Ivan Findley, Morgan Hill; Teddy Lee Anderson, San Jose, both of Calif.

[73] Assignee: International Business Machines Corporation, Armonk, N.Y.

[22] Filed: Nov. 11, 1974

[21] Appl. No.: 522,995

[52] U.S. Cl. ............ 340/172.5; 340/324 R; 178/30; 178/15; 197/20
[51] Int. Cl.² ............ G06F 3/12; G06F 7/32; G06F 13/00
[58] Field of Search ............ 178/15, 25, 30; 445/1; 101/13, 93; 197/16, 19, 20, 133 R

[56] References Cited

UNITED STATES PATENTS

| | | | |
|---|---|---|---|
| 3,332,071 | 7/1967 | Goldman et al. | 340/172.5 |
| 3,382,963 | 5/1968 | Cralle et al. | 197/16 |
| 3,419,322 | 12/1968 | Adler | 350/161 |
| 3,506,779 | 4/1970 | Brown et al. | 178/15 |
| 3,586,120 | 6/1971 | Adler | 181/.5 |
| 3,622,701 | 11/1971 | Gardner | 178/30 |
| 3,624,607 | 11/1971 | Mita et al. | 340/146.3 AH |
| 3,634,828 | 1/1972 | Myers et al. | 340/172.5 |
| 3,678,498 | 7/1972 | Nagamatsu et al. | 340/324 A |
| 3,688,033 | 8/1972 | Hell et al. | 178/15 |
| 3,701,972 | 10/1972 | Berkeley et al. | 340/172.5 |
| 3,701,999 | 10/1972 | Congleton et al. | 346/76 L |
| 3,719,781 | 3/1973 | Fulton et al. | 178/30 |
| 3,750,189 | 7/1973 | Fleischer | 346/74 ES |
| 3,760,376 | 9/1973 | Tanner | 340/172.5 |
| 3,815,094 | 6/1974 | Smith | 340/172.5 |
| 3,815,104 | 6/1974 | Goldman | 340/172.5 |
| 3,820,123 | 6/1974 | Ammann | 354/7 |
| 3,848,232 | 11/1974 | Leibler et al. | 340/172.5 |
| 3,868,672 | 2/1975 | Johnson | 340/324 AD |
| 3,878,536 | 4/1975 | Gilliam | 340/324 AD |
| 3,886,526 | 5/1975 | Smith | 340/324 A |
| 3,893,075 | 7/1975 | Orban et al. | 340/172.5 |
| 3,895,374 | 7/1975 | Williams | 340/324 AD |
| 3,945,480 | 3/1976 | Gubelman et al. | 197/20 X |

*Primary Examiner*—Gareth D. Shaw
*Assistant Examiner*—Jan E. Rhoads
*Attorney, Agent, or Firm*—Fraser and Bogucki

[57] ABSTRACT

Intermixing of line heights in a buffered printer is accomplished by storing a different byte in a forms control buffer for each line of coded character data in a page to be printed. As the coded data of each line is advanced for printing by an arrangement which modulates a laser beam during scanning across a printable medium to effect the printing, the byte within the forms control buffer corresponding to the line about to be printed causes selection of the number of scans of the laser beam to be used in printing the line, thereby determining the height of each line independently of the other lines in the page. Blank lines in the page are formed by channel commands to the printer which instruct an address register associated with the forms control buffer to be incremented to cause skipping to a particular channel number identified by one of the bytes in the forms control buffer or to cause spacing by a specified number of lines. Each time the address register is incremented a special coded character byte is inserted into the page being made up of the coded character data. Upon printing the occurrence of each special coded byte causes inhibiting of the printing arrangement, thereby forming a blank line.

16 Claims, 5 Drawing Figures

INTERMIXED LINE HEIGHTS AND BLANK LINE FORMATION IN A BUFFERED PRINTER

BACKGROUND OF THE INVENTION

1. Field of the Invention

The present invention relates to printers of the type which print characters in response to coded digital data, and more particularly to arrangements within such printers for varying the heights of printed lines and for inserting blank lines into a form.

2. History of the Prior Art

Printers of the type which print graphic characters in response to coded character data in binary form have found widespread use in many data processing operations and systems. Such printers respond to the incoming coded character data to physically print the graphic characters represented by the character data as defined by the code thereof. The printing operation can assume various different forms including the well-known impact printer in which each segment of the coded character data results in the selection of a piece of type or other raised indicia. The selected piece of type strikes a piece of paper or other printable medium to effect printing of the desired graphic character.

Prior art printers of the type described suffer from a number of disadvantages which often limit their usefulness. One limitation of such printers relates to the difficulties in varying the heights of the characters in the lines being printed. Depending upon system design, character height is typically difficult or impossible to vary. In particular it is impossible to vary the height of characters from one line to the next so as to intermix lines of different height within a given page being printed. Further disadvantages reside both in the nature of the printer itself and in the particular techniques which must be employed to insert blank lines into a form being printed. For example, it would be desirable to be able to insert blank lines into a form as it is being made up using simple digital techniques which result in a blank line during the subsequent printing process.

BRIEF DESCRIPTION OF THE INVENTION

The present invention provides for intermixed line heights and blank line insertion in a buffered printer by using a forms control buffer which stores a plurality of forms control bytes, each corresponding to a different line of a page being made up for printing. The page is made up in a page buffer in which coded character data is stored, line by line, as received. Each forms control byte includes a bit identifying the height of the characters in a corresponding line in the page buffer. The forms control bytes also identify channel numbers for subsequent reference by channel command words transmitted from a data processing unit to which the printer is ultimately coupled. The forms control bytes are themselves communicated to the printer and stored in the forms control buffer by channel command words from the data processing unit, as are the coded character bytes representing characters to be printed. An address register associated with the forms control buffer is incrementable between the various storage locations of the forms control buffer to skip to and address a particular forms control byte stored within the forms control buffer or to space through a selected number of the forms control bytes in response to instructions from a channel command.

The data assembled in the page buffer is loaded, one line at a time, into a line buffer within a character generator where the contents of the line buffer and the corresponding forms control byte in the forms control buffer are examined. The character generator responds to each character byte in the line buffer by selecting a corresponding group of character image bits which define the modulation required of a scanning laser beam to effect printing of the desired character on a printable medium sensitive to the laser beam. The system effects printing on the medium, one line at a time, by undergoing a succession of scans across the printable medium and modulating the laser beam in accordance with the various sets of character image bits selected by the data in the line buffer. Prior to printing each line the corresponding forms control byte in the forms control buffer is examined to determine the desired character height of the line. This information is used in a scan counter to determine the number of scans of the laser beam to be used in printing the line. If the maximum character height is selected, then the maximum number of scans per line is used in printing the line. If a character height less than the maximum is dictated, then selected ones of the scans at the beginning and at the end of the scanning sequence for the line are deleted.

Blank lines are inserted in the page as it is made up in the page buffer by channel command words, the instructions from which specify by channel number or spacing number the next line to be entered into the page buffer upon completion of entry of each line in the page buffer. If the channel command specifies the next line to be printed in terms of a particular forms control byte, the system responds by incrementing the address register so as to skip to a location where the address register addresses the forms control byte defining the selected channel number. Alternatively the channel command specifies the number of times the address register is to be incremented before the next line to be printed is entered. Upon each such incrementing of the address register a special coded byte is entered in the page buffer to indicate the presence of a blank line. As previously noted each line from the page buffer is examined as it is entered in the line buffer of the printing arrangement. If a special coded byte is detected, a latch associated with the line buffer is set, and the printing arrangement is momentarily inhibited so as to leave a blank line of specified height on the printable medium.

BRIEF DESCRIPTION OF THE DRAWINGS

The foregoing and other objects, features and advantages of the invention will be apparent from the following more particular description of a preferred embodiment of the invention, as illustrated in the accompanying drawings, in which.

DETAILED DESCRIPTION

Figure 1:
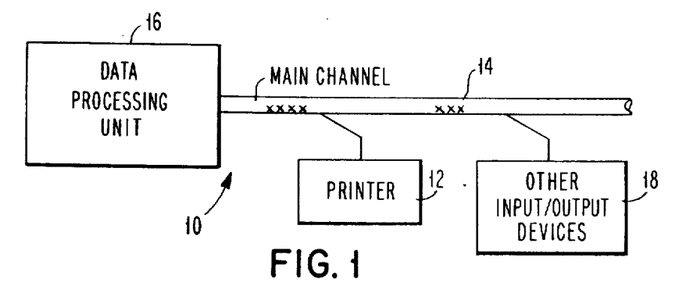
FIG. 1 is a basic block diagram showing the manner in which printers according to the invention are coupled to a data processing unit via a main channel.

FIG. 1 illustrates a data processing system 10 which includes a printer 12 in accordance with the invention coupled to a main channel 14 of a data processing unit or computer 16. The printer 12 comprises an input/output device, and the main channel 14 may be and is typically coupled to other input/output devices illustrated as 18 in FIG. 1.

The general operation of the data processing system 10 in conjunction with the printer 12 is described in detail in a co-pending application, Ser. No. 522,998, Gerald I. Findley, PRINTER. As described in that application the data processing unit 16 which typically includes a central processing unit and a main store communicates with the printer 12 and the other input/output devices 18 via the main channel 14. Character code bytes, each of which represents a different character to be printed by the printer 12, are originated in the data processing unit 16 and are communicated to the printer 12 as part of a channel command word sent to the main channel 14. Other channel command words originating in the data processing unit 16 include certain operating constants used in the printer 12 and certain instructions for the operation of the printer 12.

Figure 2:
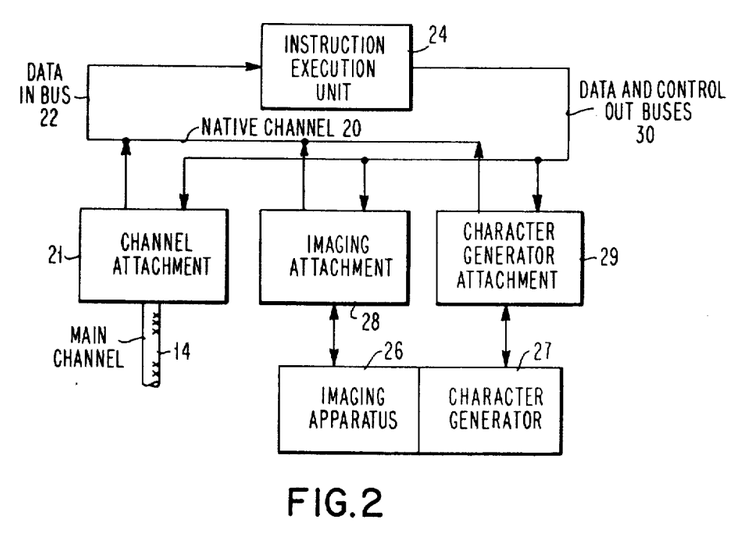
FIG. 2 is a block diagram of the basic components comprising the printer shown in FIG. 1.

FIG. 2 shows the basic arrangement of the printer 12 of FIG. 1 according to the invention. The printer 12 includes a native channel 20 coupled to the main channel 14 via a channel attachment 21 and providing appropriate interface between the main channel 14 and the printer 12. Data from the data processing unit 16 is communicated over the main channel 14 to the channel attachment 21 where it is carried by a data in bus 22 within the native channel 20 to an instruction execution unit (IEU) 24. The data in bus 22 also provides data to the instruction execution unit 24 from imaging apparatus 26 and a character generator 27. The imaging apparatus 26 is coupled to the native channel 20 via an imaging attachment 28, and the character generator 27 is coupled to the native channel 20 via a character generator attachment 29. Data at the output of the instruction execution unit 24 is carried by data and control out buses 30 to the character generator 27, the imaging apparatus 26 and the native channel 20.

The instruction execution unit 24 stores the data from the data processing unit 16 and executes the instructions provided by the various microroutines of microprograms loaded by the printer's user from a flexible disk storage. The microprograms define eight prioritized levels, during the last of which various commands from the main channel 14 are executed. Execution of the various microroutines initiates operation of the imaging apparatus 26, processes the data to be printed into an appropriate form for communication to the character generator 27, operates the character generator 27 to provide sets of character image bits corresponding to characters to be printed to the imaging apparatus 26, and operates the imaging apparatus 26 to effect printing of the desired characters.

The operation of the various components of the printer 12 shown in FIG. 2 is described in detail in the previously referred to co-pending application, Ser. No. 522,998.

Figure 3:
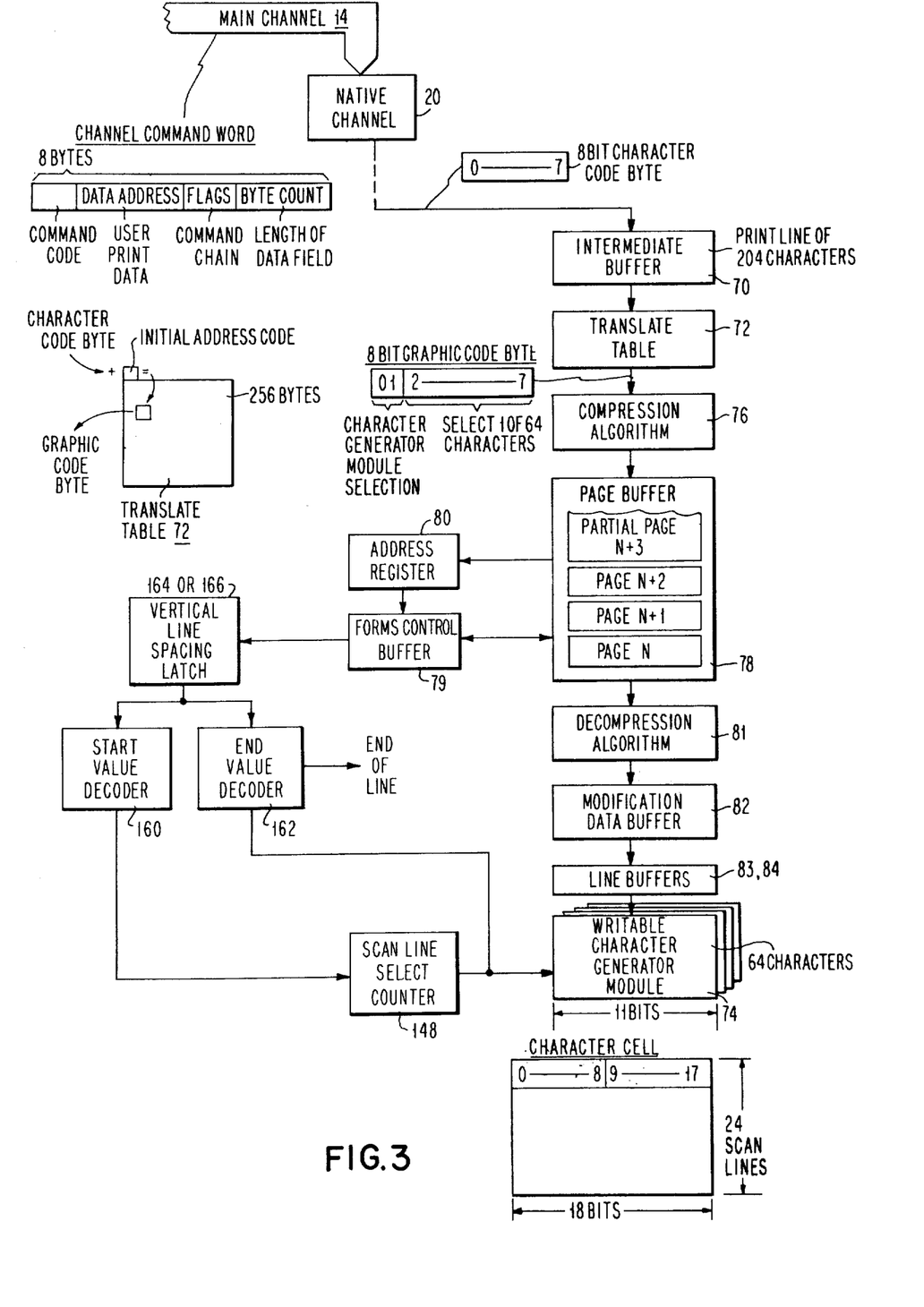
FIG. 3 is a block diagram illustrating a portion of the printer of FIG. 1 in detail.

Selected portions of the instruction execution unit 24 and the character generator 27 are illustrated in FIG. 3. The instruction execution unit 24 includes a writable control storage area providing for most of the various components shown in FIG. 3. The various components are set up within the writable control storage area using data and instructions communicated over the main channel 14 from the data processing unit 16.

Data representing characters to be printed is communicated by the data processing unit 16 and initially stored in the instruction execution unit 24 in the form of a succession of 8 bit character code bytes, with each byte representing a character to be printed. As illustrated in FIG. 3 the eight bit character code bytes which comprise the user print data portion of channel command words originated in the data processing unit 16 and communicated into the main channel 14 are directed via the native channel 20 to an intermediate buffer 70. The channel command word also includes a command code which the printer 12 is to execute, flags which control execution of the channel command word by the main channel 14 and a length of data field which indicates the number of characters in the print line which is comprised of the various 8 bit character code bytes in the user print data and which is communicated to the intermediate buffer 70.

Up to 204 of the character code bytes are assembled in the intermediate buffer 70 to form a print line. 204 characters represents the maximum width of a print line for paper of given width in the imaging apparatus 26. The 8 bit character codes employ a hexidecimal representation to compact the data and are encoded using the well-known EBCDIC code. The EBCDIC coding of the bytes defines the characters which the various bytes represent. The various character code bytes stored in the intermediate buffer 70 are applied to a translate table 72 where they are translated, one-by-one, into corresponding graphic code bytes using the predetermined code or algorithm of the translate table 72. The predetermined code or algorithm of the translate table 72 is implemented by adding each character code byte to an initial address for the table 72 and using the resulting sum as an address for the corresponding graphic code byte stored within one of the various storage locations in the translate table 72. The translate table 72 is capable of storing up to 256 graphic code bytes, and has a position for all possible character codes that can come from the data processing unit 16. An example of the manner in which the translate table 72 may be set up is provided at page 57 of *IBM System/360 Principles of Operation*, Form A22-6821-6, Jan. 13, 1967, published by International Business Machines Corporation. Each of the graphic code bytes comprises the address of a set of character image bits stored within one of four different writable character generator modules 74 in the character generator 27. As shown in FIG. 3 each 8 bit graphic code byte from the translate table 72 comprises a first two bit field identifying a particular one of the four different writable character generator modules 74 and a second six bit field identifying 1 of 64 different storage locations within the selected writable character generator module. The selection of a storage location within one of the writable character generator modules 74 by a graphic code byte results in a set of character image bits stored in the particular location being used by the imaging apparatus 26 to print a character.

The graphic code bytes from the translate table 72 are next compressed in length using a compression algorithm 76 as they are entered into a page buffer 78 for storage therein. As previously mentioned each line may comprise as many as 204 characters. Since a page can have as many as 80 lines thereon for 11 inch paper, a page can comprise as many as 16,320 bytes. Since the purpose of the page buffer 78 is to assemble the translated data into one or more pages, the page buffer 78 would have to have a minimum capacity of 16,320 bytes per page in the absence of compression. By using the compression algorithm 76 however the graphic code bytes for an average page are sufficiently reduced in number so that an equivalent of only about 2000 bytes is required in the way of storage space for each page in the page buffer 78.

In the present example compression is performed whenever a succession of identical characters occurs which has more than a predetermined number of the characters in it. The resulting information stored in the page buffer 78 consists of a first byte which identifies the presence of a compression, a second byte which indicates the number of characters being compressed, and a third byte which is the character being compressed. An example of a compression technique which may be used is provided in IBM Technical Disclosure Bulletin Vol. 16, No. 8, January 1974, DATA COMPRESSION TECHNIQUE FOR THE ELIMINATION OF REPEATING BYTE STRINGS, M. Ojalvo.

The page buffer 78 continues to assemble the compressed graphic code bytes into pages until filled. While the page buffer 78 is only required to store at least one complete page, it is typically provided with enough storage capacity to store several pages as shown in FIG. 3.

In accordance with the present invention the channel command words from the data processing unit 16 include certain modifier bits which control the vertical format of each page. The space between lines and the height of the characters in each line are provided by a forms control buffer 79 in conjunction with an associated address register 80. The forms control buffer 79 is loaded by a channel command from the main channel 14. A different forms control byte is stored in the forms control buffer 79 for each line in a page. The address register 80 identifies the various forms control bytes. One bit of each forms control byte defines the height of a corresponding line and is applied in the character generator 27 to select the number of scan lines used when the line is printed. Other bits in each forms control byte define a channel number. A channel command word defines blank lines to be inserted in a page by specifying the numbers of channels to be skipped to or the number of lines to be spaced. Each time the address register 80 is incremented in skipping to the sought channel number or spacing the specified number of lines within the forms control buffer 79, a special code hexidecimal FE (11111110) is entered in the page buffer 78. When the page is being printed by the character generator 27, each of the special codes causes the character generator 27 to idle momentarily so that a blank line results in the printed page. The operation of the forms control buffer 79 and the address register 80 is described in detail hereafter.

The compressed graphic code bytes assembled into pages in the page buffer 78 are decompressed upon leaving the page buffer 78 by a decompression algorithm 81 which is the reverse of the compression algorithm 76 prior to being passed together with data from a modification data buffer 82 to one of a pair of line buffers 83, 84 within the character generator 27. The decompression algorithm 81 restores each graphic code byte to the original form that it assumes at the output of the translate table 72. The modification data buffer 82 stores data used in making minor changes between copies when plural copies of the same page are to be printed. This avoids the necessity of assembling a complete page in the page buffer 78 for each page which differs only in minor respects from a previously printed copy.

The imaging apparatus 26 of the present example modulates a laser beam as the beam is scanned in raster fashion over a character space to print each character. Each character space is defined by a character cell having a height defined by 24 scans of the laser beam and a width defined by 18 bits representing the number of times the beam can be modulated during each scan of the character cell. Each set of character image bits stored in one of the writable character generator modules 74 comprises as many as 432 bits defining the 18 horizontal bit spaces for each of the 24 different scans of the laser beam. Accordingly the character image bits define those portions of the grid pattern or matrix comprising the character cell which the particular character to be printed comprises.

Figure 4:
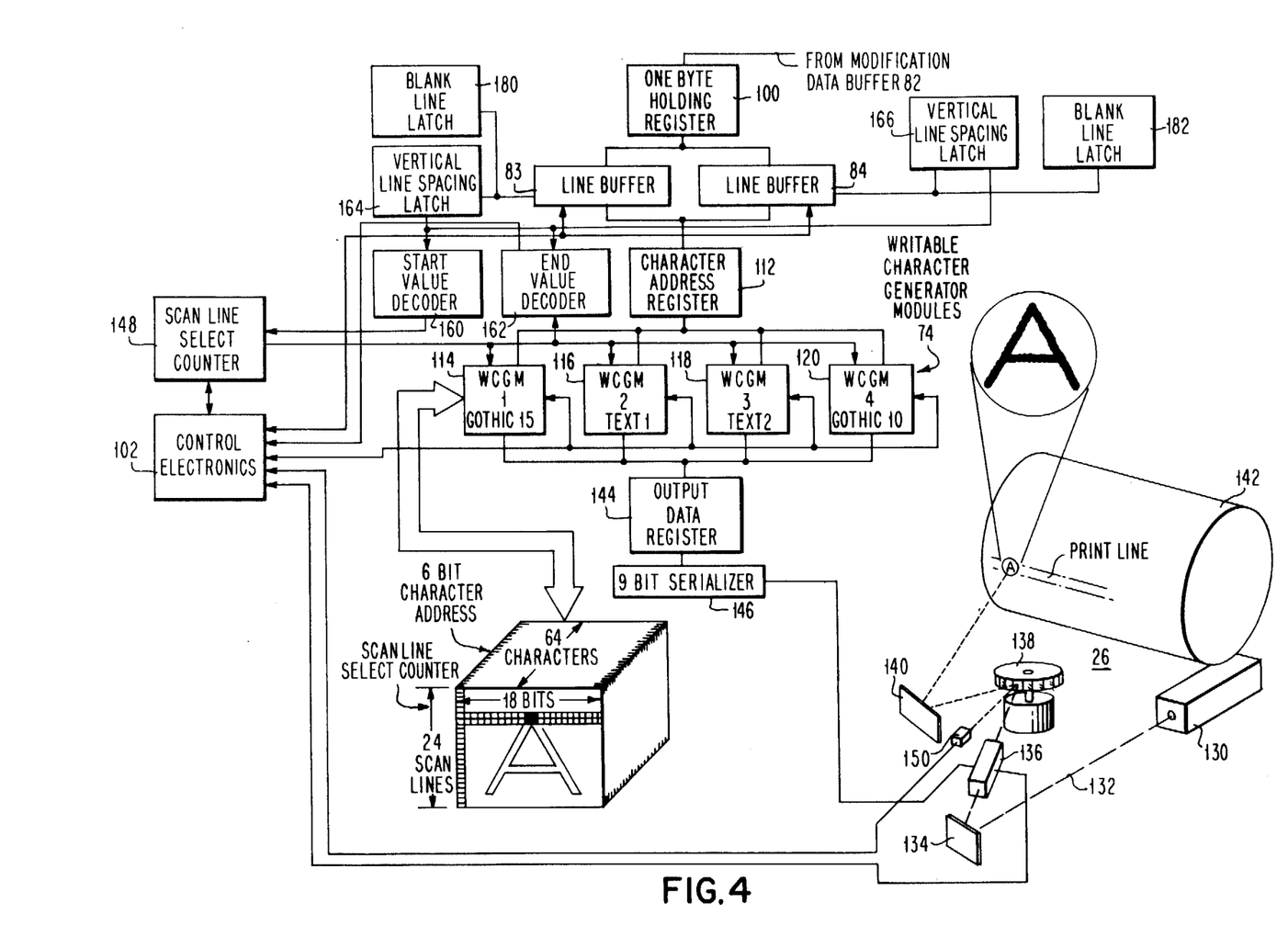
FIG. 4 is a block diagram illustrating another portion of the printer of FIG. 1 in detail; and, FIG. 5 is a graphical illustration of the forms control buffer and associated components and the manner in which the printing of blank lines is facilitated.

The character generator 27 is shown in FIG. 4 together with a portion of the imaging apparatus 26. The graphic code bytes at the output of the modification data buffer 82 within the instruction execution unit 24 are fed via the native channel 20 to the character generator 27 where they are received by a 1 byte holding register 100 at the inputs of the line buffers 83 and 84. The loading and unloading of the line buffers 83 and 84 are controlled by control electronics 102. The control electronics 102 responds to control data fed from the native channel 20 to cause the contents of one of the line buffers 83, 84 to be passed to the writable character generator modules 74 for printing while the other line buffer is being loaded from the one byte holding register 100, and vice versa. Accordingly the line buffers 83 and 84 alternately load and print.

The four different character generator modules 74 comprise modules 114, 116, 118 and 120. The first module 114 is loaded with Gothic 15 pitch characters, the second module 116 is loaded with characters conforming to a text 1, the third module 118 is loaded with characters conforming to a text 2 and the fourth module 120 is loaded with Gothic 10 pitch characters. Each of the modules 114, 116, 118 and 120 is capable of storing up to 64 characters. The contents of the first character generator module 114 are graphically illustrated in FIG. 4 in terms of the 24 scans of 18 bits each comprising each of the 64 characters. Two of the 18 bit scan lines are shown for the top portion of the character A. As previously described the bits within the module 114 modulate a laser beam to produce the desired character.

The imaging apparatus 26 includes a laser 130 for providing an energy beam in the form of a laser beam 132. The laser 130 may comprise a low power Helium neon laser, as shown, for example, in U.S. Pat. No. 3,750,189. The laser beam 132 is reflected by a mirror 134 through a modulator 136 and onto a rotating mirror 138. The modulator 136 may comprise an acoustooptic modulator of the type shown in U.S. Pat. Nos. 3,419,322 and 3,586,120. The rotating mirror 138, which may comprise a series of reflective facets on a metal block as shown, for example, in U.S. Pat. No. 3,750,189, has a plurality of small mirrors spaced about the periphery thereof so as to reflect the laser beam from the modulator 136 into a mirror 140. The mirror 140 reflects the modulated laser beam onto a rotating print drum 142. The rotating mirror 138 rotates at a selected speed to provide a rapid succession of scans of the modulated laser beam across the print drum 142.

The modulator 136 causes the laser beam 132 to be modulated by bits from the character generator modules 74 applied via an output data register 144 and a nine bit serializer 146. Examples of circuits which can be used as the nine bit serializer 146 are shown on page 9-124 of the First Edition of *The Integrated Circuits Catalog For Design Engineers*, published by Texas Instruments Incorporated. Timing of the character generator modules 74 is controlled by a scan line select counter 148 which is initialized to the first scan line at the start of each print line. The scan line select counter 148 operates in response to scan sync signals from a scan start detector 150 to synchronize the outputting of bits from the character generator modules 74 with the rotation of the mirror 138. The scan start detector 150, which comprises a sensing device responsive to light of laser wavelength such as a photocell, a phototransistor or a photodiode of the type shown, for example, in U.S. Pat. No. 3,750,189, generates a signal in response to each facet of the rotating mirror 138 and therefore signals the beginning of each scan. As each scan is begun circuitry within the control electronics 102 signals the scan line select counter 148 to pick a particular scan of a graphic in one of the writable character generator modules 74 and to begin feeding bits from one of the character generator modules 74 to the output data register 144. Circuitry within the control electronics 102 keeps a count of the various character positions in the line buffers 83, 84. At the beginning of each scan as determined by the scan line select counter 148, the character address register 112 causes selection of the appropriate bits from the writable character generator modules 74 under the control of counting circuitry within the control electronics 102. The control electronics 102 responds to the scan sync signal at the start of each scan to turn on the modulator 136 and the laser 130 for the next scan start.

As printing is begun the 18 bits comprising the first scan of the first character which are temporarily stored in the output data register 144 are advanced to the 9 bit serializer 146 where each of the bits is serially fed to the modulator 136 to modulate the laser beam 132 as it scans across the first character. At this point the first scan of the second character on the line is begun by transferring the 18 bits of the scan via the output data register 144 and the 9 bit serializer 146 to modulate the laser beam. The system continues in this fashion until the laser beam has completed the first scan of each of the characters in the line, at which point the scan line select counter 148 is incremented and the next scan of the laser beam begins and is sensed by the scan start detector 150. The resulting scan sync signal from the scan start detector 150 causes the outputting of the data bits for the second scan of the first character to the output data register 144 and the 9 bit serializer 146 to print the second scan of the first character. The bits comprising the second scan for each succeeding character are used to modulate the laser beam until the second scan of the entire print line is completed. The system continues in this fashion until the laser beam has made 24 scans of the print line and all characters on the line have been printed. Thereafter the process is repeated for each succeeding print line.

As described in detail in the previously mentioned co-pending application, Ser. No. 522,998, the imaging apparatus 26 employs known electrophotographic techniques to develop the discharged areas on the surface of the drum 142 which result from the modulated laser beam 132. The drum 142 is rotated past a developer where the surface is coated with a toner which adheres to the discharged areas of the surface. The toner is transferred onto a paper which comes into contact with the drum surface, and the paper as so printed with the toner is advanced through a fuser to a continuous forms stacker.

The various components of the printer 12 and the operation thereof described thus far are described in greater detail in the previously referred to co-pending application, Ser. No. 522,998. That application goes on to describe in detail the processing of the microprogram by the instruction execution unit 24. The lowest of the eight different prioritized levels of the microprogram provides for execution of channel commands transferred from the data processing unit 16 to the printer 12 during an earlier and higher level. The first of five different types of channel commands are designated "forms commands." The forms commands control the vertical format of a page via the forms control buffer 79. The forms control buffer 79 which contains control information for vertical line spacing is loaded with the specifications for a paper control tape before any transfer of data from the data processing unit 16 to the page buffer 78 takes place. When data is transferred to the page buffer 78, contents of the forms control buffer 79 are analyzed. When necessary blank lines are inserted into the page buffer 78. If it is determined that a complete page is ready for printing, the page is readied for read out to the character generator 27 and the next form within the page buffer 78 is positioned within the page buffer so as to follow the completed page.

The forms control buffer 79 consists of 96 storage positions (one byte each) with each position corresponding to a physical line on the form. One of the bits in each byte is a "vertical space bit" and determines whether the vertical spacing is to be six lines per inch or eight lines per inch. The number of forms control bytes transferred over the main channel 14 and entered into the writable control storage 40 determines the length of the forms control buffer 79. After the forms control buffer 79 is loaded, spacing and skipping operations are accomplished by blank line insertion (1 byte for each line) in the page buffer 78. The character generator responds to each such byte by providing an unprinted blank line on the page.

Referring to FIG. 4 the forms control buffer 79 is coupled through a vertical line spacing latch 164 or 166 and a start value decoder 160 to the scan line select counter 148. The latches 164 and 166 are respectively coupled to the line buffers 83 and 84. The output of the scan line select counter 148 in addition to being coupled to the writable character generator modules 74 as described in connection with FIG. 4 is also coupled to an end value decoder 162 coupled with the vertical line spacing latch 164 or 166. As previously discussed in connection with FIG. 4 the scan line select counter 148 denotes in sequence each of the scans as each line is printed, and thereby controls the advancing of the appropriate character image bits out of the writable character generator modules 74 to modulate the laser beam as the various scans are made. As each line in one of the line buffers 83, 84 is readied for printing, the vertical space bit in the corresponding forms control byte within the forms control buffer 79 is detected and set into the vertical line spacing latch 164 or 166 which is coupled to the start value decoder 160 and the end value decoder 162. If the vertical space bit denotes that the character height of the line is to be a maximum so that all 24 scans are used and six lines per inch are printed, a first one of the pair of AND gates comprising the start value decoder 160 responds by providing an indication to the scan line select counter 148 that the counter 148 is to begin with the first scan. The latch 164, 166 coupled to the particular one of the line buffers 83, 84 from which data is about to be fed is left in its reset state indicating that the vertical line spacing is six lines per inch. The end value decoder 162 responds to the vertical space bit indicating the maximum character height of six lines per inch by determining that the twenty-fourth scan is to be the last scan of the line to be printed. Thereafter the scan line select counter 148 begins the printing of the line by causing the bits corresponding to the first scan of each character to be passed via the output data register 144 and the 9 bit serializer 146 to the modulator 136 in the manner previously described in connection with FIG. 4. When the character generator reaches the twenty-fourth scan, the resulting output of the scan line select counter 148 causes a first one of the pair of AND gates and associated OR gate comprising the end value decoder 162 to determine that no more scans are to be made for that line. An end of line signal at the output of the end value decoder 162 is applied to the control electronics 102 to insure that no further scans of this line buffer are made. At this point the printing of the line is completed. The next line buffer 83 or 84 is selected and the scan line select counter 148 is set to the start value specified by the vertical line spacing latch 164 or 166 associated with the line buffer being used and the process is repeated. The start value decoder 160 responds to the vertical line spacing latch 164 and 166 associated with the line buffer being used what the first scan will be and the end value decoder 162 responds similarly to determine what the last scan will be.

When the vertical space bit in the forms control buffer 79 indicates that the character height is to be reduced to provide eight lines per inch instead of six lines per inch, the start value decoder 160 and the end value decoder 162 respond by selecting an intermediate portion of the 24 scans so that selected ones of the scans at the beginning and at the end of the scanning sequence are deleted. In the present example the characters in such a line are truncated by printing only 18 of the 24 possible scans. The first four scans and the last two scans of the 24 scan sequence are deleted. A second one of the pair of AND gates comprisng the start value decoder 160 provides an indication to the scan line select counter 148 to begin printing the line with the fifth scan. The scan line select counter 148 responds by causing the bits corresponding to the fifth scan of the various characters in one of the line buffers 83, 84 being read from to be advanced out of the writable character generator modules 74 to the output data register 144, the 9 bit serializer 146 and finally the modulator 136. The system sequences through the various scans until the twenty-second scan is reached. At this point the resulting output from the scan line select counter 148 causes the second one of the pair of AND gates and associated OR gate comprisng the end valve decoder 162 to provide a signal to the control electronics 102, thereby preventing the twenty-third and twenty-fourth scans of the line of characters from being printed.

It will be seen that in arrangements according to the invention each line of characters on a given page as made up in the page buffer 78 has a height which is independent of the character heights of other lines in the page and which is determined by the vertical space bit of the forms control byte in the forms control buffer 79 corresponding to the line. It is therefore possible to intermix line heights within a given page. At the beginning of each new line, the printer prints the new line at a height determined by the corresponding vertical space bit in the forms control buffer 79 and without regard to the heights of preceding or following lines in the page.

Whenever the vertical space bit corresponding to a line about to be printed indicates that the lower character height equivalent to eight lines per inch is to be used, the vertical line spacing latch 164, 166 associated with the line buffers 83, 84 containing the line about to be printed is changed from the reset to the set state to indicate that the lower line height is being used.

The forms control bytes which originate in the data processing unit 16 are communicated over the main channel 14 and stored in the forms control buffer 79 prior to transmission of the character code bytes over the main channel 114 and into the intermediate buffer 70. Accordingly the forms control bytes for the various different lines are already stored in the forms control buffer 79 when the various lines are loaded from the intermediate buffer 70 into the page buffer 78. Each forms control byte has four bits which define a channel number that the particular storage location in the forms control buffer 79 represents. The channel command words from the main channel 14 which control the formation of a page in the page buffer 78 provide for blank line formation using the forms control buffer 79 and the address register 80 in accordance with the invention. This is accomplished by having the channel command words define the channel number in the forms control buffer 79 to be reached or the number of lines to be spaced by incrementing the address register 80. The register 80 is incremented until the specified channel number in the forms control buffer 79 is addressed by the address register 80 or the number of lines to be spaced have been spaced. A blank line code designation hexidecimal FE is inserted in the page buffer 78 each time the address register 80 is incremented. Thus by specifying the locations of lines to be printed within a page in terms of a channel number within the forms control buffer 79 or a number of spaced lines, a blank line symbol is entered in the page buffer 78 for each incrementing of the register 80 between the lines to be printed. Each code designation hexidecimal FE in the page buffer 78 results in a blank line during the printing process. This is accomplished by one of a pair of blank line latches 180 and 182 respectively coupled to the line buffers 83 and 84. Each time an FE code is to be advanced to one of the line buffers 83, 84, the associated blank line latch 180, 182 is set. When the system looks to the line buffer 83, 84 containing the next line to be printed, the associated blank line latch 180, 182 is examined. If the latch is set, the control electronics will cause the character generator 27 to be momentarily inhibited, thereby forming a blank line in the form being printed.

Figure 5:
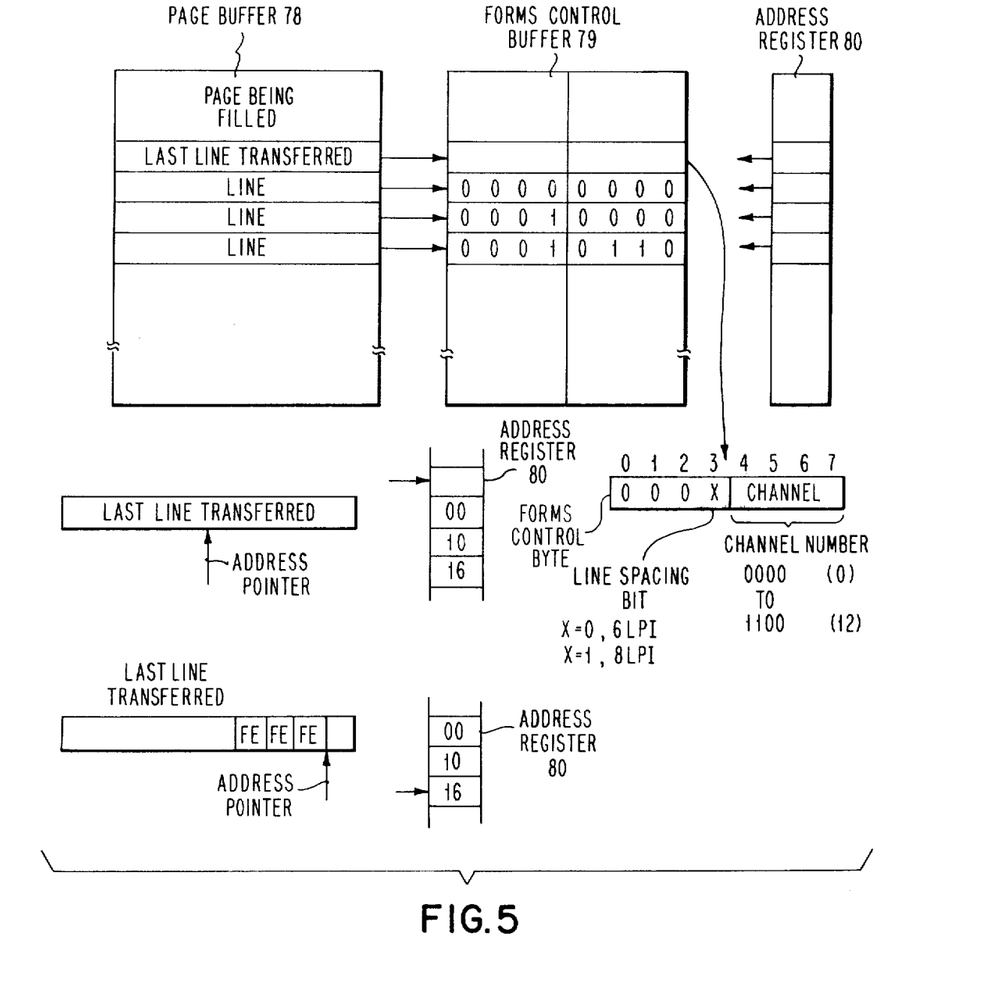

The forms control buffer 79 and the address register 80 are shown in FIG. 5 in terms of the manner in which they interact with one another and with the page buffer 78. As shown in FIG. 5 each line being entered in the page buffer 78 has a corresponding 8 bit forms control byte in the buffer 79. The fourth bit of each byte which is the vertical space bit or line spacing bit designates the height of the characters in the corresponding line. In the present example a binary 0 represents six lines per inch, while a binary 1 represents eight lines per inch. This bit is used to set the vertical line spacing latch which is utilized by the start value decoder 160 and the end value decoder 162 to determine the height of the line as it is printed, in the manner previously described. The remaining four bits of each forms control byte comprise the channel number. In the present example there are twelve channels, beginning with 0000 and ending with 1100. The address register 80 has a address position corresponding to each of the different storage locations in the forms control buffer 79.

When a blank line is inserted into the page buffer 78 the coded hexidecimal FE is stored in the page buffer 78 to indicate a space or skipped blank lines. Blank lines are inserted in the page buffer 78 as necessary to accomplish the spacing or skipping function required by the channel command. Thus if the command is to write and space three lines, the print lines are stored in the page buffer 78 following which two blank lines are inserted into the page buffer 78. If the channel command is to write and skip to a particular channel in the forms control buffer 79, then many blank lines may be inserted into the page buffer 78 until the address register 80 encounters the channel to be skipped to. For example, if the command is to skip to channel 6 in the forms control buffer 79, the forms control buffer address register 80 must be incremented three positions to reach channel 6. As illustrated in FIG. 5 the process of incrementing to channel 6 produces three blank lines in the page buffer 78. This is provided by the three codes FE which are inserted into the page buffer 78 as the address register 80 is incremented by three lines.

While the invention has been paticularly shown and described with reference to a preferred embodiment thereof, it will be understood by those skilled in the art that various changes in form and details may be made therein without departing from the spirit and scope of the invention.

What is claimed is:

1. An arrangement for printing characters of variable height represented by received data comprising:
   buffer means;
   means responsive to the received data for assembling the data into a page comprised of plural lines in the buffer means;
   means responsive to the received data for providing a separate identification of desired character height for each of the lines of the page;
   means responsive to the received data arranged into a page in the buffer means for printing on a medium the characters represented by the data, one line at a time; and
   means responsive to the identification of desired character height for each line for providing the characters in the line with the desired height as the line is printed.

2. The invention defined in claim 1, wherein the received data comprises character bytes, each of which defines a character to be printed, and vertical control bits, each of which defines desired character height for a different line.

3. The invention defined in claim 1, wherein the means for printing includes means for repetitively scanning the medium with an energy beam and means for modulating the energy beam in accordance with characters to be printed, the energy beam being modulated in accordance with a different group of modulation data for each scan of the medium by the means for repetitively scanning, and the means for providing the characters in a line with the desired height as the line is printed comprises means for selecting the number of scans to be made by the energy beam to print the line.

4. An arrangement for printing characters of variable height, each of the characters being represented by a different segment of digital character data, comprising:
   means for providing an energy beam;
   means for repetitively sweeping the energy beam across an energy sensitive medium in successive scans, each scan being displaced from the immediately preceding scan along the length of the medium;
   means for storing different groups of modulation information, each group defining a particular character in terms of modulation of each of a plurality of scans of the energy beam across the energy sensitive medium and comprising a predetermined number of rows of modulation bits;
   means responsive to a plurality of the different segments of digital data representing a line of characters to be printed for modulating the energy beam during successive scans of the energy sensitive medium in accordance with the groups of stored modulation information defining the characters in the line, a different row of modulation bits of the stored modulation information being used for each of the successive scans of the energy sensitive medium;
   means for storing a plurality of different segments of digital forms control data, each segment of digital forms control data defining the height of the characters in a different line to be printed; and
   means responsive to the segments of digital forms control data for a line of characters for selecting the number of scans of the energy beam to determine the height of characters in the line of characters as the energy beam is modulated by the groups of modulation information to cause printing of the line of characters.

5. The invention defined in claim 4, wherein each segment of digital forms control data defines the number of scans of the energy beam to be used in printing a different line.

6. The invention defined in claim 5, wherein each group of modulation information contains modulation, information for a succession of scans, and each segment of digital forms control data defines either the full succession of scans or an intermediate part of the full succession of scans.

7. An arrangement for printing characters in response to character data representing lines of characters to be printed and channel commands representing blank lines, comprising:
   storage means;
   means responsive to receipt of the character data by said arrangement for assembling the character data into plural lines in the storage means to define a page;
   register means having a plurality of different data storage locations therein corresponding to the lines of a page to be printed, and responsive to each channel command representing a blank line to be successively incremented to a data storage location therein designated by said channel command;

means responsive to each incrementing of the register means for entering a special code into the storage means identifying a blank line within a page to be printed; and means for sequentially accessing the character data stored in the storage means for printing characters represented thereby on a medium, one line at a time, said means for printing being responsive to each special code in the storage means to leave a blank line on the medium.

8. The invention defined in claim 7, wherein the means for entering a special code into the storage means includes means for storing plural segments of forms control data, each segment corresponding to a line to be entered in the storage means, and the register means is operative to address different segments of forms control data in the means for storing and includes means responsive to a channel command representing a blank line for incrementing the register means to address an identified segment of forms control data, and means responsive to each incrementing of the register means for entering the special code into the storage means.

9. The invention defined in claim 7, wherein there are a plurality of storage locations in the storage means, each of the storage locations being adapted to receive a different line of the page, and the register means is incremented a selected number of times in response to each channel command representing a blank line.

10. An arrangement for printing characters in response to character data representing characters to be printed and channel commands for instructing the operation of the arrangement for printing, comprising:

means for temporarily storing the character data, the character data being arranged into blocks;

forms control means for storing a separate item of data corresponding to each block of character data to be stored in the means for temporarily storing, the forms control means including means responsive to each channel command to advance to one of the separate items of data for inserting a special code in the means for temporarily storing as the one of the separate items of data is advanced to; and, means coupled to the means for temporarily storing for printing characters represented by the character data, one block at a time, the means for printing leaving a blank block in response to each special code stored in the means for temporarily storing.

11. The invention defined in clam 10, wherein the means for printing includes means for receiving and storing data from the means for temporarily storing, one block at a time, means responsive to each block of character data stored in the means for receiving and storing for printing characters represented by the block of character data, and means responsive to each special code in the means for receiving and storing for causing the means for printing characters to be inhibited long enough to print a blank block.

12. The invention defined in claim 11, wherein the means for receiving and storing includes buffer means coupled to the means for temporarily storing, and the means for causing the means for printing characters to be inhibited includes latch means coupled to change state in response to entry of a special code in the buffer means.

13. The invention defined in claim 10, wherein the forms control means includes forms control buffer means for storing a plurality of different items of data, each item corresponding to a different possible block of character data to be stored in the means for temporarily storing and being stored in a different position therein, incrementable address register means being incrementable between the different positions of the forms control buffer means to address a particular item of data stored in the forms control buffer means, means responsive to each channel command to address a particular item of data for successively incrementing the address register means to the position of the forms control buffer means in which the particular item of data is stored, and means responsive to each incrementing of the address register means for storing a special code in the means for temporarily storing.

14. The invention defined in claim 13, wherein each block of character data comprises a control byte identifying the nature of the block and a plurality of character bytes, each of which represents a different character in the block to be printed, and each special code comprises a control byte identifying the presence of a blank block.

15. An arrangement for printing characters in response to character data representing characters to be printed and forms control data specifying the height of characters to be printed and the locations of blank lines in the characters to be printed, comprising:

means for storing the forms control data;

buffer means;

means responsive to the character data for assembling the data into the plural lines in the buffer means to define a page;

means responsive to forms control data specifying the locations of blank lines for inserting items of coded data in the page where blank lines are to occur;

means responsive to the page of character data for printing on a medium the characters represented by the data, one line at a time;

means responsive to forms control data specifying the height of characters in each line to be printed independent of other lines to be printed for providing the characters in the line with the desired height as the line is printed; and means responsive to each item of coded data in the page for leaving a blank line on the medium.

16. The invention defined in claim 15, wherein the means for storing the forms control data comprises a forms control buffer having a plurality of different storage locations therein, each of which corresponds to a different line of the page in the means for storing the page of character data, the forms control data comprises a plurality of bytes, each of which is stored in a different one of the storage locations in the forms control buffer and includes a first portion thereof specifying the height of the characters in the corresponding line of the page and a second portion thereof specifying a channel number, and an address register being incrementable between the different storage locations of the forms control buffer to address the bytes stored therein, and wherein the means for inserting items of coded data in the page includes means responsive to external commands for incrementing the address register through selected storage locations, and means responsive to each incrementing of the address register for inserting an item of coded data in the page.

* * * * *

UNITED STATES PATENT AND TRADEMARK OFFICE
CERTIFICATE OF CORRECTION

PATENT NO. : 4,007,442
DATED : February 8, 1977
INVENTOR(S) : Gerald I. Findley et al It is certified that error appears in the above-identified patent and that said Letters Patent are hereby corrected as shown below:

Column 12, line 53, after "modulation" (second occurrence), delete the comma (","). Column 13, line 54, after "in" and before "10", "clam" should read --claim--.

Signed and Sealed this

Nineteenth Day of April 1977

[SEAL]

Attest:

RUTH C. MASON
Attesting Officer

C. MARSHALL DANN
Commissioner of Patents and Trademarks